(12) United States Patent
Smith, III et al.

(10) Patent No.: US 7,722,259 B2
(45) Date of Patent: May 25, 2010

(54) CABLE CONNECTOR ASSEMBLY

(75) Inventors: Robert L. Smith, III, Palos Park, IL (US); Kerry E. Nelson, Carol Stream, IL (US); Guillermo Alvelo, Hoffman Estates, IL (US)

(73) Assignee: iCONN Systems, LLC, Lombard, IL (US)

( * ) Notice: Subject to any disclaimer, the term of this patent is extended or adjusted under 35 U.S.C. 154(b) by 100 days.

(21) Appl. No.: 12/221,014

(22) Filed: Jul. 30, 2008

(65) Prior Publication Data

US 2010/0027942 A1    Feb. 4, 2010

(51) Int. Cl.
  *G02B 6/36* (2006.01)
  *H01R 13/648* (2006.01)
  *H01R 4/26* (2006.01)

(52) U.S. Cl. .............................. 385/53; 385/60; 439/98; 439/426

(58) Field of Classification Search ........................ None
See application file for complete search history.

(56) References Cited

U.S. PATENT DOCUMENTS

| | | |
|---|---|---|
| 1,601,255 A | 9/1926 | Marra |
| 2,245,148 A | 6/1941 | Kohne |
| 3,539,976 A | 11/1970 | Reynolds |
| 3,739,076 A | 6/1973 | Schwartz |
| 4,159,862 A | 7/1979 | Funck et al. |
| 4,580,862 A | 4/1986 | Johnson |
| 4,710,138 A | 12/1987 | Bradley et al. |
| 4,854,893 A | 8/1989 | Morris |
| 4,898,173 A | 2/1990 | Daglow et al. |
| 4,921,447 A | 5/1990 | Capp et al. |
| 4,927,374 A | 5/1990 | Batty |
| 4,941,850 A | 7/1990 | Ankers et al. |
| 4,990,106 A | 2/1991 | Szogda |
| 5,080,614 A | 1/1992 | Utgaren |
| 5,104,342 A | 4/1992 | Liu et al. |
| 5,127,843 A | 7/1992 | Henry et al. |
| 5,217,393 A | 6/1993 | Del Negro et al. |
| 5,338,225 A | 8/1994 | Jocobsen et al. |
| 5,362,258 A | 11/1994 | Arnswald et al. |
| 5,823,803 A | 10/1998 | Majors |
| 6,039,594 A | 3/2000 | Zuppa |
| 6,482,036 B1 | 11/2002 | Broussard |
| 7,351,095 B2 | 4/2008 | Olsen |
| 2005/0227545 A1 | 10/2005 | Lahoreau et al. |

*Primary Examiner*—Omar Rojas
(74) *Attorney, Agent, or Firm*—McCracken & Frank LLP

(57) ABSTRACT

A cable connector assembly includes a fitting having first and second fitting ends and a fitting opening therethrough, wherein the fitting is formed from a conductive material. The cable connector assembly further includes a ferrule having first and second ferrule ends, a ferrule opening therethrough, and one or more teeth disposed axially along the ferrule opening, wherein the ferrule is formed from a conductive material. The first ferrule end is disposed over the second fitting end. The cable connector assembly further includes a tube including an outer nonconductive layer and an inner conductive layer. The tube is disposed between the second fitting end and the first ferrule end and the ferrule is secured around the fitting so that at least one of the one or more teeth pierce the outer nonconductive layer and make contact with the inner conductive layer to create an EMI/RFI shield across the fitting, the ferrule, and the tube.

20 Claims, 10 Drawing Sheets

CABLE CONNECTOR ASSEMBLY

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates to connectors and, more particularly, to cable connectors that are adapted for use in high moisture environments, high heat environments, high mechanical wear environments, abrasive environments, and/or environments subject to electromagnetic interference.

2. Description of the Background of the Invention

Cables commonly include one or more wires or optical fibers encased within a protective jacket and are widely used to carry power and/or data between various points. A connector is needed when such power and/or data are transferred from one cable to another or to a device that uses the power and/or processes the data. Connectors vary widely depending on the type of connection, e.g., permanent or removable, the type of cable, e.g., coaxial cable, a power cable, a fiber optic cable, data cable, etc., and the environment in which the cable is used, e.g., under pressure, in high mechanical wear environments, in high heat or moisture environments, and the like. Various other considerations also affect the design of such connectors, including electromagnetic interference, the environment in which the connectors will be utilized, and keying structures to only allow connections with compatible mating connectors and for ease of mating with compatible mating connectors.

In one example, a cable connector includes a cable with a jacket made of an insulating material surrounding a braid that further surrounds one or more wires. The cable jacket is stripped away from the braid and an exposed length of braid is folded back over the cable jacket to create a braid contact surface. The cable connector further includes a tubular shield having a smooth outer surface, wherein the shield is placed over the cable and in contact with the braid contact surface. A coupling ring that has a coupling mechanism, such as a threaded surface on an inner surface thereof, is further secured to an end of the tubular shield. The cable connector further includes an insulating insert that has a stopper intermediate first and second ends thereof. A second end of the insulating insert is inserted into the shield until the stopper abuts a lip of the shield to prevent further axial movement of the insert into the shield. The insulating insert further includes pin-socket contacts in a central portion thereof corresponding to the wires of the cable, wherein the insert serves to insulate the wires from other conductive components of the cable connector, such as, the braid, the shield, and the coupling ring.

SUMMARY OF THE INVENTION

In one embodiment, a cable connector assembly includes a fitting having first and second fitting ends and a fitting opening therethrough, wherein the fitting is formed from a conductive material. The cable connector assembly further includes a ferrule having first and second ferrule ends, a ferrule opening therethrough, and one or more teeth disposed axially along the ferrule opening, wherein the ferrule is formed from a conductive material. The first ferrule end is disposed over the second fitting end. The cable connector assembly further includes a tube including an outer nonconductive layer and an inner conductive layer. The tube is disposed between the second fitting end and the first ferrule end and the ferrule is secured around the fitting so that at least one of the one or more teeth pierce the outer nonconductive layer and make contact with the inner conductive layer to create an EMI/RFI shield across the fitting, the ferrule, and the tube.

In another embodiment, a cable connector assembly includes a fitting having first and second fitting ends and a fitting opening therethrough, wherein the fitting is formed from a conductive material. The cable connector assembly further includes a coupling ring formed from a conductive material, wherein the coupling ring is secured around the first fitting end. The cable connector assembly further includes a ferrule having first and second ferrule ends, a ferrule opening therethrough, and a plurality of teeth disposed axially along the ferrule opening. The ferrule is formed from a conductive material and the first ferrule end is disposed over the second fitting end. In addition, the cable connector assembly includes a tube including an outer nonconductive layer and an inner conductive layer, wherein the tube is disposed between the second fitting end and the first ferrule end. The ferrule is secured around the fitting so that at least one of the plurality of teeth pierce the outer nonconductive layer and make contact with the inner conductive layer to create an EMI/RFI shield across the coupling ring, the fitting, the ferrule, and the tube.

In yet another embodiment, a cable connector assembly includes a fitting having first and second fitting ends and a fitting opening therethrough, wherein the fitting is formed from a conductive material. The cable connector assembly further includes a coupling ring formed from a conductive material, wherein the coupling ring contacts the first fitting end. The cable connector assembly still further includes a ferrule having first and second ferrule ends, a ferrule opening therethrough, and one or more teeth disposed axially along the ferrule opening. The ferrule is formed from a conductive material and the first ferrule end is disposed over the second fitting end. The cable connector also includes at least one wire disposed within a tube, wherein the tube includes an outer nonconductive and heat resistant layer, a middle conductive layer, and an inner nonconductive layer. The tube is disposed between the second fitting end and the first ferrule end. Further, the ferrule is secured to contact the fitting and so that at least one of the one or more teeth pierce the outer nonconductive layer and make contact with the middle conductive layer to create an EMI/RFI shield across the coupling ring, the fitting, the ferrule, and the tube.

Other aspects and advantages of the present invention will become apparent upon consideration of the following detailed description.

DETAILED DESCRIPTION OF THE PREFERRED EMBODIMENTS

Figure 1:
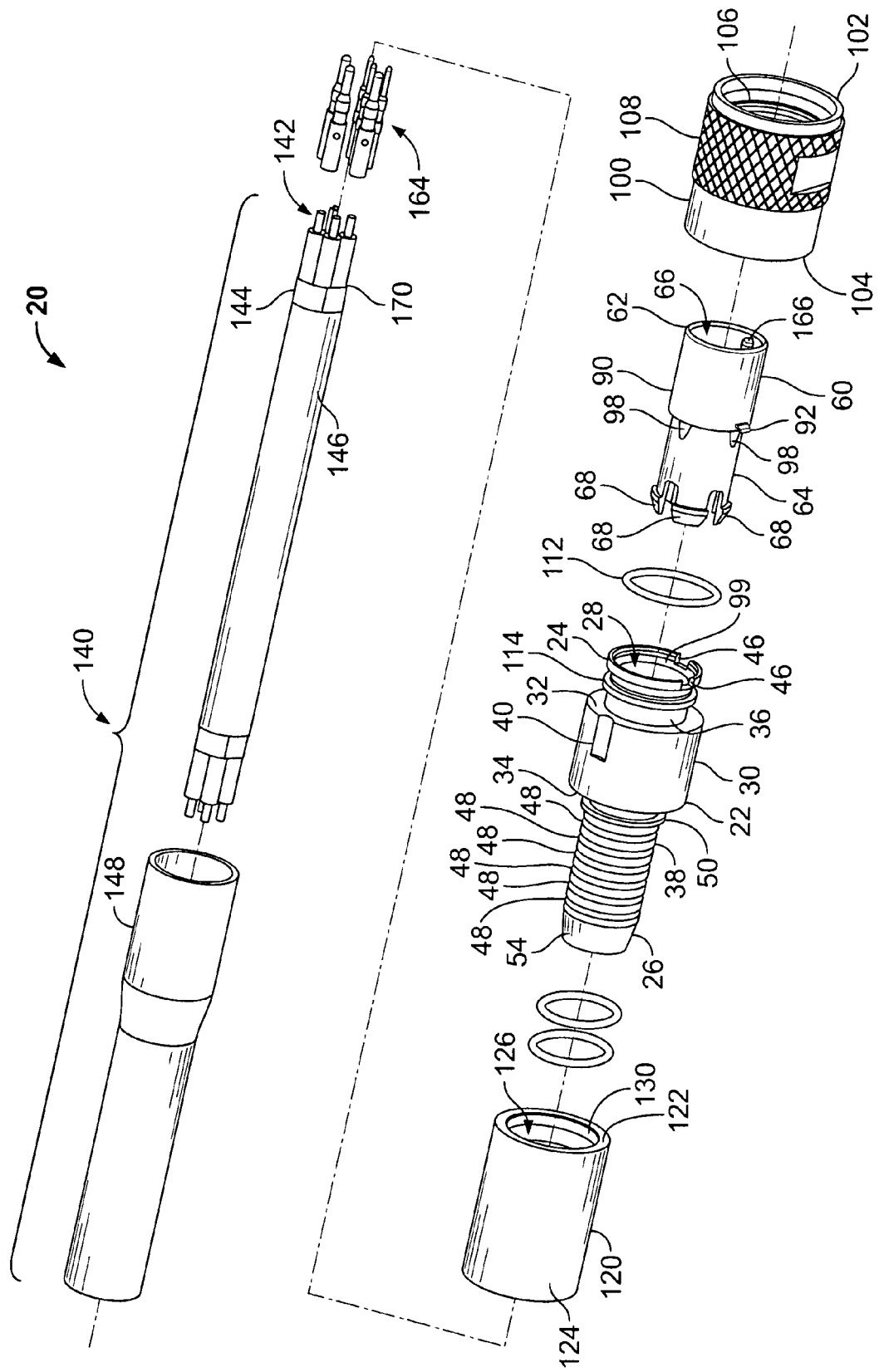
FIG. 1 illustrates an exploded isometric view of a first embodiment of a cable connector assembly.
Figure 2:
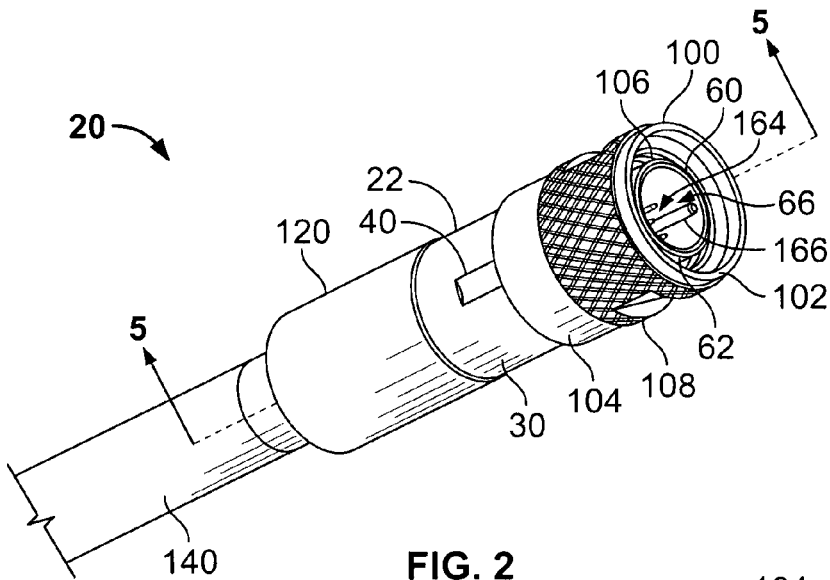
FIG. 2 illustrates an isometric view of the cable connector assembly of FIG. 1.
Figure 4:
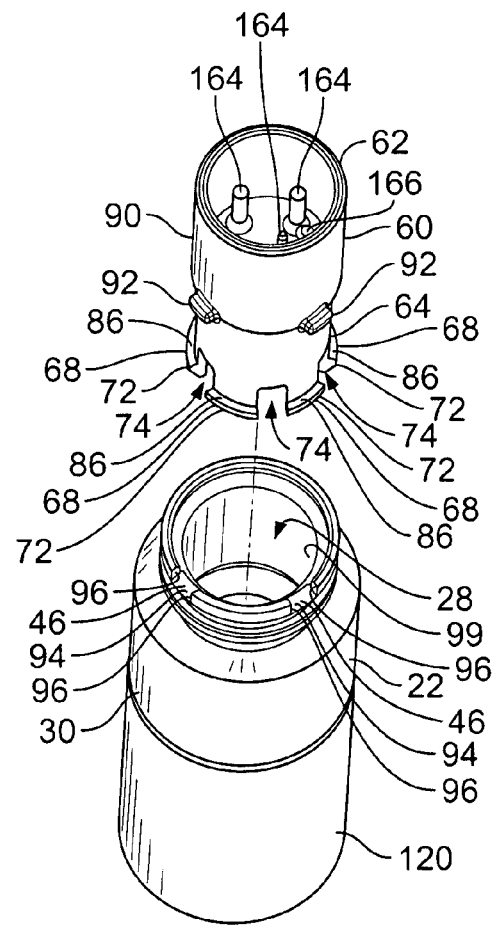
FIG. 4 is an exploded top isometric view of an insert and a fitting of the cable connector assembly of FIGS. 1 and 2.
Figure 5:
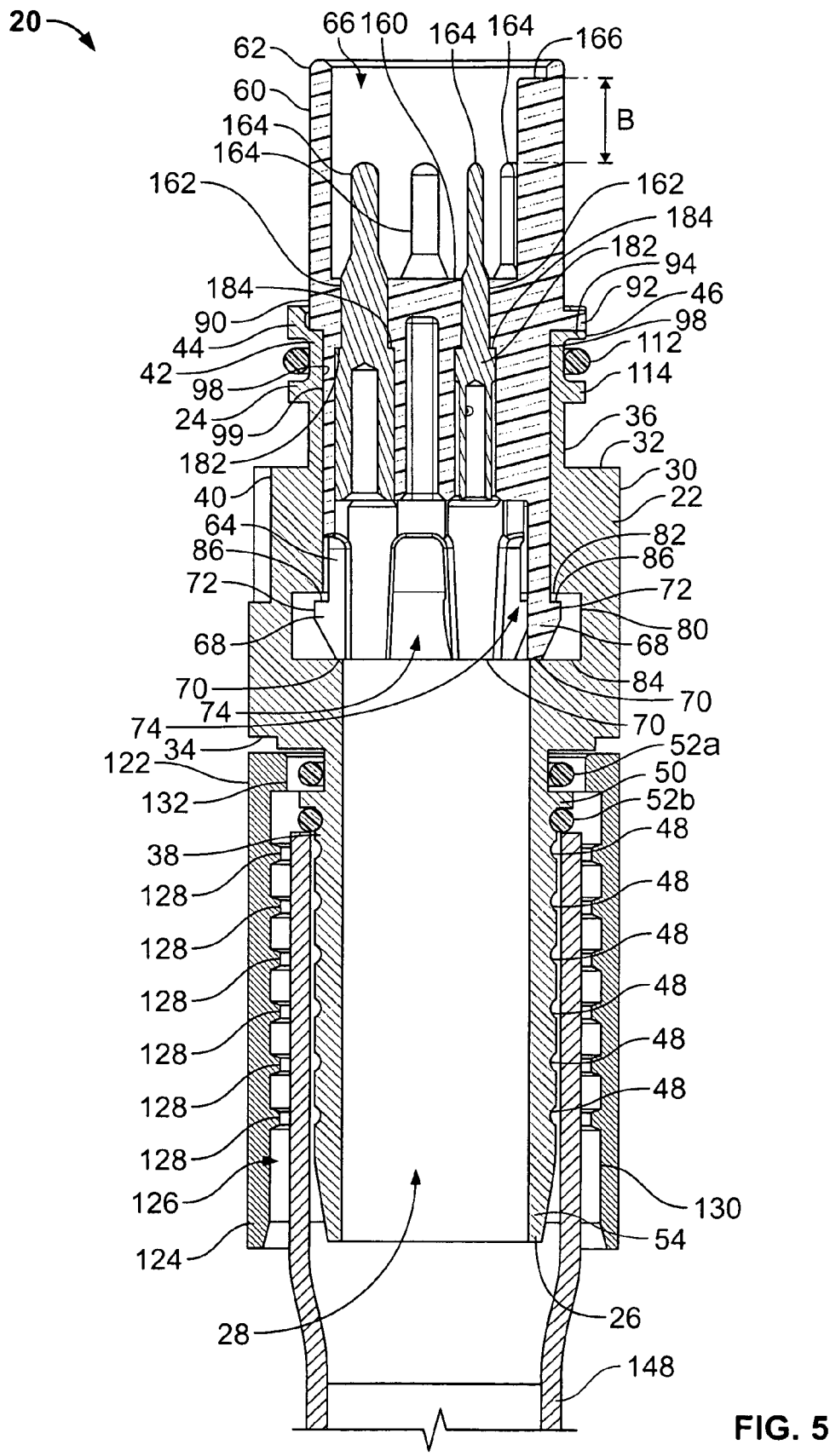
FIG. 5 is an enlarged cross-sectional view taken generally along the lines 5-5 of FIG. 2 with wires removed therefrom for clarity.
Figure 5A:
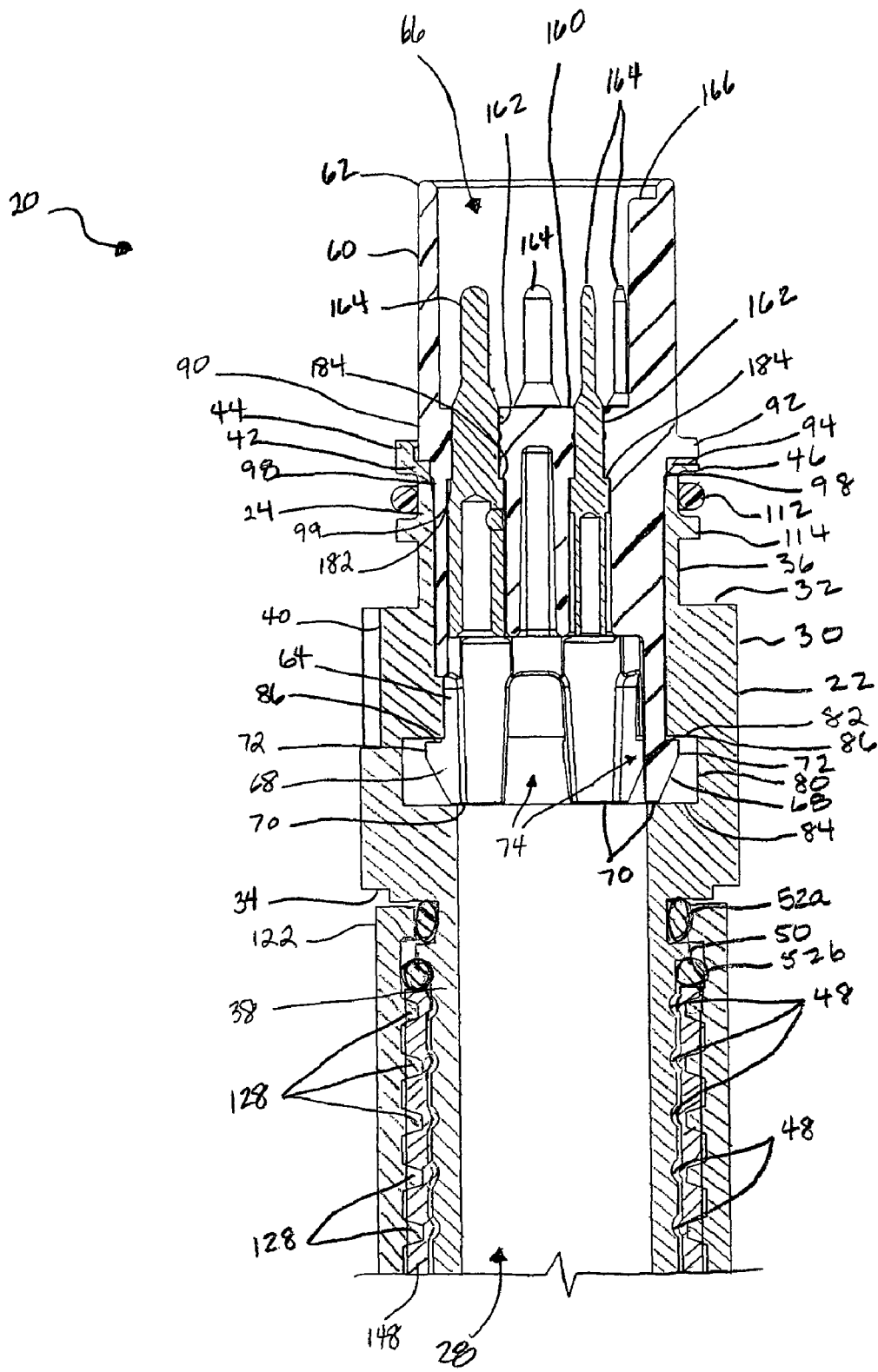
FIG. 5A is an enlarged, broken, cross-sectional view similar to that of FIG. 5 with a ferrule thereof crimped.
Figure 6:
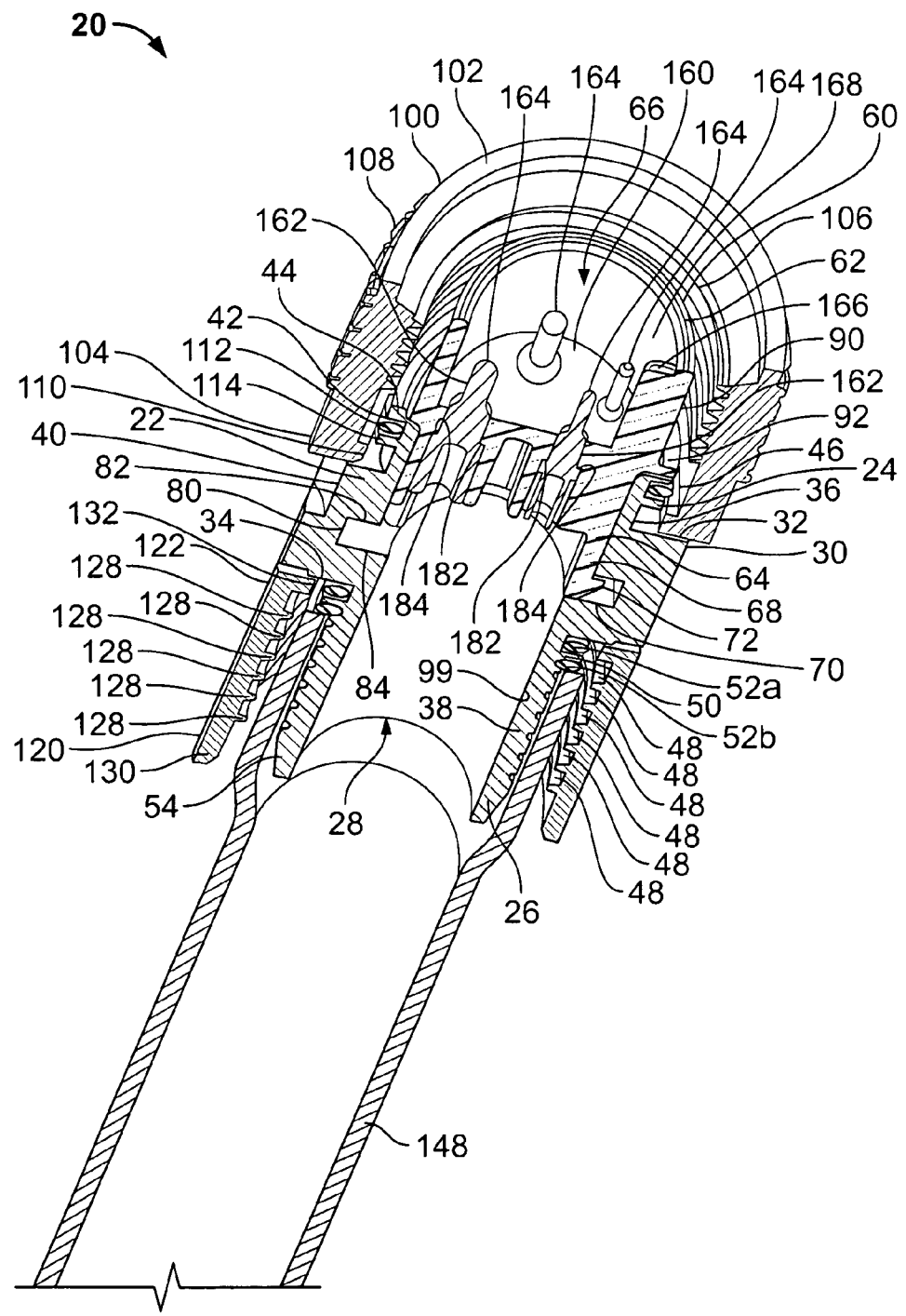
FIG. 6 is an isometric enlarged partial cross-sectional view of the cable connector assembly of FIG. 2, taken generally along the lines 5-5 of FIG. 2 with wires removed therefrom for clarity.
Figure 7:
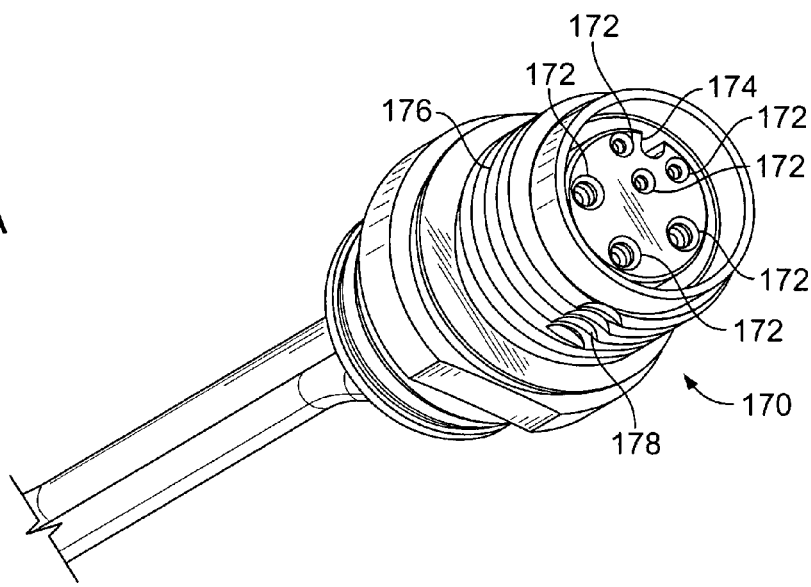
FIG. 7 is an isometric view of a mating connector.

FIGS. 1 and 2 depict a cable connector assembly 20 having a fitting 22 with a first fitting end 24 and a second fitting end 26. A generally cylindrical fitting opening 28 is defined through the fitting 22. In the embodiment of FIG. 1, the fitting 22 is formed from a conductive material, such as copper, aluminum, conductive stainless steel, other steel, brass, and the like. However, in other embodiments, the fitting 22 may be formed from any other suitable material(s) known to one or ordinary skill in the art. As best seen in FIGS. 1, 5, and 6, the fitting 22 includes a shoulder 30 defined by first and second shoulder walls 32, 34 and first and second walls 36, 38 that extend axially from the shoulder walls 32, 34, respectively, toward the first and second fitting ends 24, 26, respectively. A notch 40 is defined in the shoulder 30, wherein the notch 40 is used as a visual alignment guide for a mating connector, as shown in FIG. 7 and described in greater detail hereinafter. More specifically, after the connector assembly 20 is attached to a mating connector, the notch 40 is oriented in a specific position, such as upwardly facing, to correspond to a bend in a cable or other component, for ease of use thereof. Referring more specifically to FIG. 5, the first wall 36 ends in an outwardly tapered wall 42 and the outwardly tapered wall 42 terminates in a shoulder portion 44 that has grooves 46 formed therein, as best seen in FIGS. 1 and 4. Referring to FIGS. 1, 5, and 6, annular grooves 48 are defined in the second wall 38 and spaced axially from the second shoulder wall 34 toward the second fitting end 26. As seen in FIGS. 5, 5A, and 6, an annular wall 50 extends outwardly from the second wall 38 between the second shoulder wall 34 and a first of the annular grooves 48. First and second O-rings 52a, 52b are disposed on opposite sides of the annular wall 50, wherein the function of the O-rings 52a, 52b will be described in more detail hereinafter. The fitting 22 further includes a tapered portion 54 at the second fitting end 26, as seen in FIGS. 1, 5, and 6. Modifications to the fitting 22 can be made as would be apparent to one of ordinary skill in the art. For example, the fitting 22 may include any number of grooves 46 at the first fitting end 24 and/or any number of annular grooves 48 on the second wall 38. Still further, the grooves 48 may not be fully annular in form, but instead, may be segmented.

The connector assembly 20 further includes an insert 60 having first and second insert ends 62, 64 and a generally cylindrical insert opening 66 therethrough. The insert 60 is formed from a nonconductive material, such as plastic, epoxy, and the like. However, in other embodiments, the insert 60 may be formed from any other suitable material(s) known to one or ordinary skill in the art. Flexible snap legs 68 are disposed at the second insert end 64. Each leg 68 includes an end 70 that is disposed at the second end 64 of the insert 60 and an outwardly extending projection 72 that tapers inwardly toward the end 70. The snap legs 68 are spaced apart by openings 74 formed therebetween. The second insert end 64 is inserted into the first fitting end 24 and the snap legs 68 of the insert 60 flex inwardly to permit the insert 60 to pass into the fitting 22. As seen in FIGS. 5 and 6, an annular cavity 80 is defined within a central portion of the fitting opening 28 by a first downwardly facing ledge 82 and a second upwardly facing ledge 84. Once the snap legs 68 pass the first ledge 82, the snap legs 68 move outwardly such that upwardly facing surfaces 86 of the outwardly extending projections 72 interfere with the first ledge 82 to prevent outward axial movement of the insert 60 with respect to the fitting 22 while the ends 70 of the snap legs 68 interfere with the second ledge 84 to prevent inward axial movement of the insert 60 with respect to the fitting 22. The snap legs 68 are thereby captured within the cavity 80 to maintain the axial position of the insert 60 relative to the fitting 22.

Figure 3:
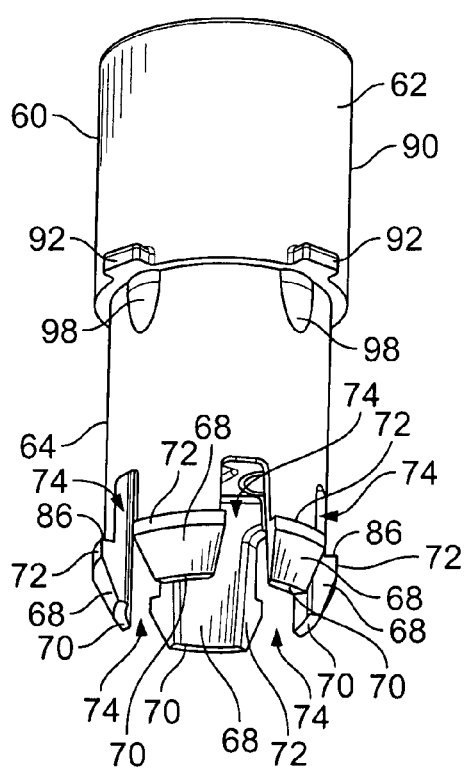
FIG. 3 is a bottom isometric view of an insert of the cable connector assembly of FIGS. 1 and 2.

As best seen in FIGS. 1, 3, and 4, the insert 60 further includes a downwardly facing annular shoulder 90 disposed in a central portion thereof and projections 92 that extend outwardly from the insert 60 adjacent the shoulder 90. The shoulder 90 and the projections 92 are disposed in the first end 24 of the fitting 22 when the insert 60 is fully assembled within the fitting 22. Specifically, the projections 92 are disposed in the grooves 46 of the fitting 22 when the insert 60 is fully inserted into the fitting 22. In one embodiment, no portion of the shoulder 90 or the projections 92 contacts the tapered wall 42, the shoulder portion 44, or base walls 94 that define the axial extents of the grooves 46 of the fitting 22. Substantial rotation of the insert 60 with respect to the fitting 22 is prevented by interference of the projections 92 with circumferential side walls 96 (FIG. 4) that define annular extents of the grooves 46. As depicted in FIGS. 1, 3, and 4, the projections 92 are generally rectangular in shape and the grooves 46 have a corresponding rectangular shape. However, the shapes of the grooves 46 and the projections 92 may be modified without departing from the spirit of the present disclosure, as long as substantial rotation of the insert 60 is prevented thereby. In fact, the shapes of the grooves 46 and the projections 92 need not necessarily be the same.

Referring to FIGS. 3 and 5, the insert 60 further includes a plurality of projections or crush bumps 98 adjacent the shoulder 90. The crush bumps 98 form an interference fit between the insert 60 and a cylindrical wall 99 defining the fitting opening 28 to allow such components to fit together snugly while reducing the need for tight tolerances between the insert 60 and the cylindrical wall 99 defining the fitting opening 28. Any number of crush bumps 98 may be utilized and the crush bumps 98 may be disposed at any location adjacent the shoulder 90, for example, adjacent the projections 92 and/or spaced from the projections 92.

The connector assembly 20 further includes a coupling ring 100 with first and second coupling ring ends 102, 104 and a threaded interior surface 106, as seen in FIGS. 1 and 6. An outer surface 108 of the coupling ring 100 is generally cylindrical with a cross-hatched groove pattern. In another embodiment (not shown), the outer surface 108 of the coupling ring 100 includes a hexagonal structure. Either the hexagonal structure or the cross-hatched groove pattern can be used interchangeably in any of the embodiments disclosed herein without departing from the spirit of the present disclosure. Generally, such structures on the outer surface 108 of the coupling ring 100 merely provide a surface for a user to grip, either by hand or with a tool, to rotate the coupling ring 100. The coupling ring 100 is formed from a conductive material, such as copper, aluminum, conductive stainless steel, other steel, brass, and the like. However, in other embodiments, the coupling ring 100 may be formed from any other suitable material(s) known to one of ordinary skill in the art. The first coupling ring end 102 is attached to a mating connector and the second coupling ring end 104 is secured around the first fitting end 24. More particularly, the second coupling ring end 104 includes an inwardly directed annular lip 110 (see FIG. 6), wherein the second coupling ring end 104 is placed over the first fitting end 24 such that the annular lip 110 passes over an O-ring 112 disposed about the fitting 22 and between an outer annular flange 114 (FIGS. 1 and 4-6) that extends from the first wall 36 of the fitting 22 and the outwardly tapered wall 42 of the fitting 22. The second coupling ring end 104 is secured on the fitting 22, such as by crimping, so that the annular flange 114 interferes with the annular lip 110 to retain the coupling ring 100 on the fitting 22 while permitting rotation of the coupling ring 100 with respect to the fitting 22.

Referring to FIGS. 1, 2, 5, and 6, the cable connector assembly 20 further includes a ferrule 120 that includes first and second ferrule ends 122, 124 and a ferrule opening 126 defined therethrough. The ferrule 120 is formed from a conductive material, such as copper, aluminum, conductive stainless steel, other steel, brass, and the like. However, in other embodiments, the ferrule 120 can be formed from any other suitable material(s) known to one or ordinary skill in the art. As best seen in FIGS. 5 and 6, annular ridges 128 are disposed axially along an inner wall 130 defining the ferrule opening 126. Further, an annular shoulder 132 extends inwardly from the first ferrule end 122. The ferrule 120 may be modified as would be apparent to one of ordinary skill in the art. For example, the ferrule 120 may include any number of annular ridges 128 having any shape and/or the ridges 128 may be segmented rather than fully annular.

A cable 140 is depicted in FIG. 1 and includes one or more wires 142, a foil wrap 144 surrounding the wires 142, and a conductive braid 146 surrounding the foil wrap 144. The cable further includes a jacket or tube 148 within which the wires 142, the foil wrap 144, and the braid 146 are inserted. The foil wrap 144 is formed of a material such as an aluminum/Kapton tape wrap and the like, the braid 146 is formed of a material such as a nickel or tin plated braid and the like, and the tube 148 is formed from a material such as polytetrafluoroethylene (PTFE) and the like. However, in other embodiments, the foil wrap 144, braid 146, and tube 148 may be formed of any suitable material(s) known to one having ordinary skill in the art and/or may be modified or even omitted as would be apparent to one of ordinary skill in the art.

Referring to FIGS. 5 and 6 the insert 60 includes a central wall 160 disposed within the insert opening 66. The central wall 160 includes a plurality of openings 162 through which the wires 142 (not shown in FIGS. 5 and 6) are secured by a plurality of contacts 164. The insert 60 further includes a key structure 166 that extends axially from the central wall 160 along a wall 168 defining the insert opening 66 toward the first insert end 62 and inwardly from the wall 168 defining the insert opening 66. The key structure 166 is an elongate rib disposed along the wall 168 defining the insert opening 66.

Figure 9:
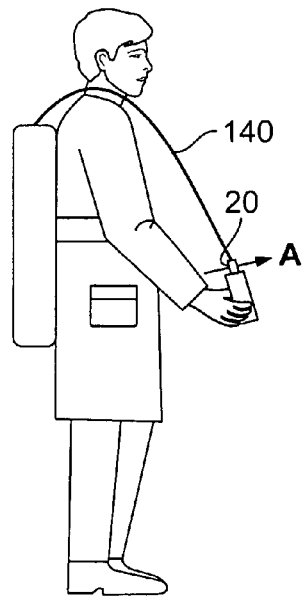
FIG. 9 is a schematic view of a user with a cable connector assembly in use.
Figure 8:
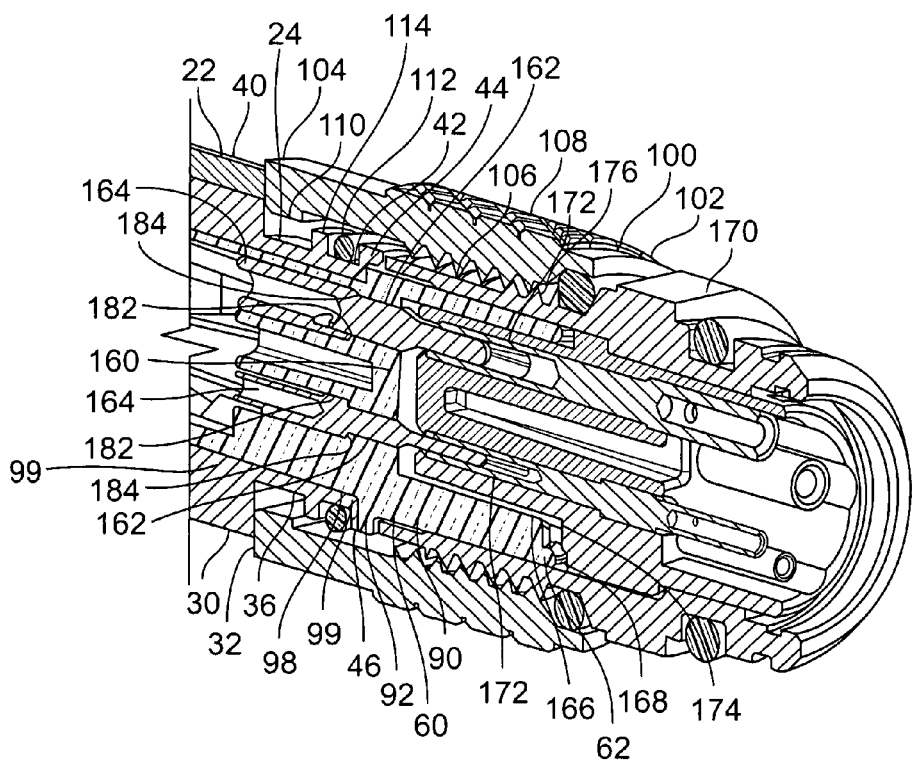
FIG. 8 is an enlarged, broken, partial cross-sectional view of the mating connector of FIG. 7 joined with the cable connector assembly of FIG. 2.
Figure 10:
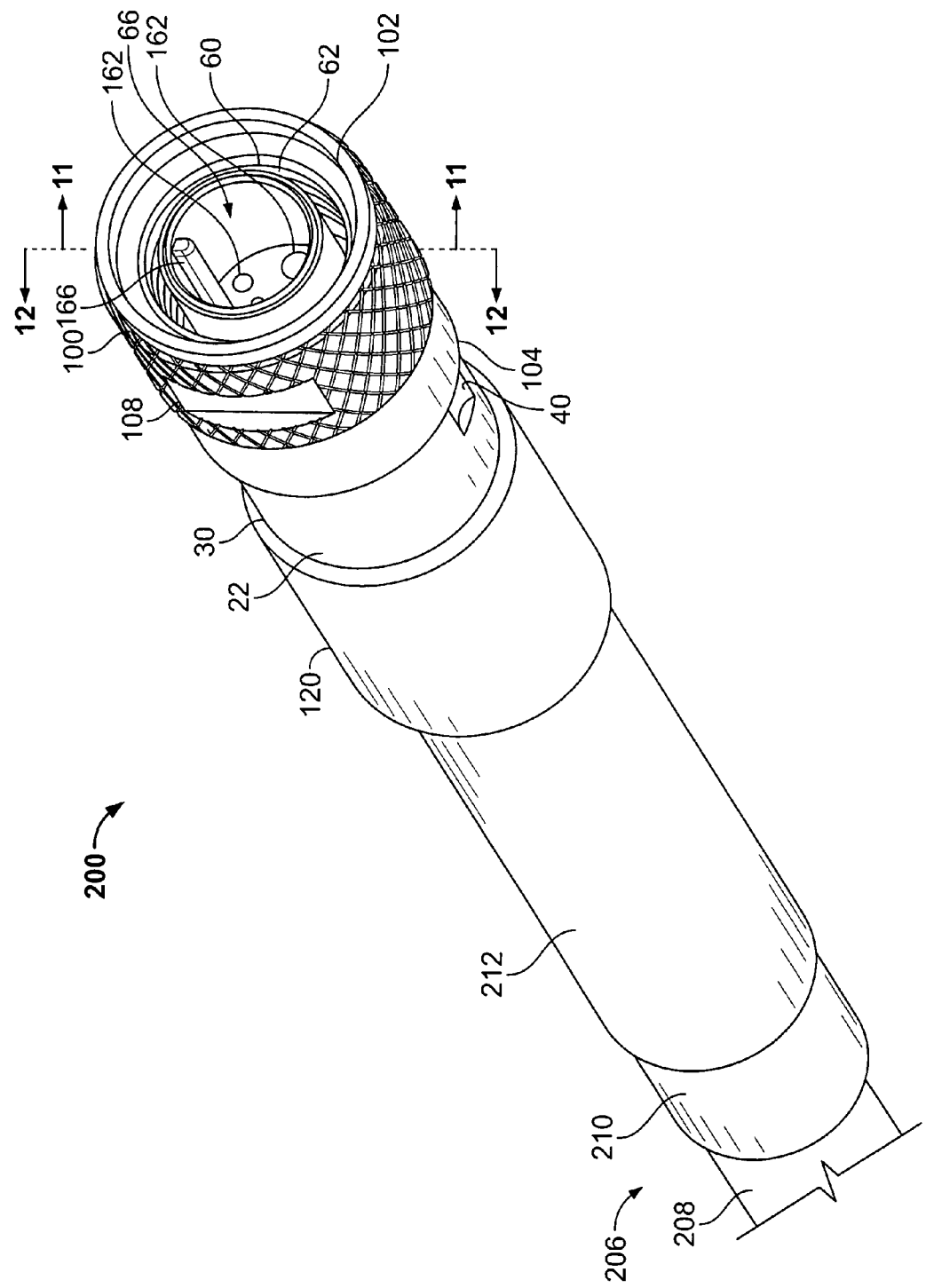
FIG. 10 is an isometric view of a cable connector assembly according to another embodiment.

Referring to FIGS. 7 and 8, a mating connector 170 includes apertures 172 for mating with corresponding contacts 164 of the cable connector assembly 20 and a grooved structure 174 for alignment and mating with the key structure 166 of the insert 60. In use, the cable 140 is positioned such that a natural curvature of the cable 140 is slung over the shoulder of a user, as seen in FIG. 9. The natural curvature of the cable 140 results from the storage of the cable 140 in a coiled form on a reel or other device. When the cable 140 is in this position, the notch 40 defined in the shoulder 30 of the fitting 22 faces up and outwardly (i.e., directly away from the user as depicted by the arrow A in FIG. 9) and is aligned with the natural curvature of the cable 40 and the key structure 166 is aligned with the natural curvature of the cable 140 and is further aligned 180 degrees from the notch 40, as seen in FIGS. 2 and 8, for example. This precise positioning of the key structure 166 allows for quick alignment of the key structure 166 on the insert 60 with the corresponding grooved structure 174 on the mating connector 170 to allow proper aligned attachment of the mating connector 170 to the cable connector assembly 20. Thereafter, the coupling ring 100 is rotated such that the threaded interior surface 106 thereof mates with a threaded member 176 of the mating connector 170 having opposite threading to join the connector assembly 20 and the mating connector 170. This design prevents a user from having to rotate the cable connector assembly 20 and/or the mating connector 170 to mate same. The mating connector 170 may also include a notch 178 or some other visual indication to more easily align the connectors.

Referring again to FIGS. 5, 6, and 8 the key structure 166 extends axially past ends of the plurality of contacts 164 toward the first insert end 62 to prevent damage to the contacts 164 when the cable connector assembly 20 is being attached to a mating connector. The key structure 166 extends a distance B past ends of the contacts 164 (see FIG. 5), wherein B is at least about 0.13 inches (about 33 millimeters). The distance B is optimized to ensure that the key structure 166 contacts walls defining a corresponding groove of the mating connector before the ends of the contacts 164 touch any part(s) of the mating connector to minimize or eliminate the possibility that the contacts 164 will be damaged during the insertion process. The key structure 166 need not extend from the central wall 160, but instead may begin at a point between the central wall 160 and the first insert end 62. Other modifications to the key structure 166 may be made as would be apparent to one of ordinary skill, such as the addition of further key structures 166, designing the key structure to have a different shape (or shapes), or the like.

The various parts of the cable connector assembly 20 are assembled by inserting the insert 60 within the fitting 22, as described in detail above, and attaching the coupling ring 100 to the fitting 22, also described in detail above. The coupling ring 100 is crimped around substantially 360° thereof. Alternatively, the coupling ring may be crimped at discrete areas thereof, wherein the discrete areas are preferably (although not necessarily) equally spaced about the periphery of the coupling ring 100. The cable 140 and ferrule 120 are assembled into the cable connector assembly 20 by placing the ferrule 120 onto the cable 140 and sliding the tube 148 back away from an end 180 of the cable 140 to expose the conductive braid 146. A length of the conductive braid 146 is folded back upon itself at the end 180 to expose a portion of the wires 142. Ends of the wires 142 are stripped of insulation and the contacts 164 are attached thereon, such as by crimping. The wires 142 are thereafter inserted into the fitting 22 until annular ledges 182 (as seen, for example, in FIG. 8) of each of the contacts 164 are stopped by ledges 184 (see FIG. 8) formed around the openings 162 in the insert 60 to retain the contacts 164 within corresponding openings 162 in the insert 60. Epoxy or any other insulating and/or securing mechanism known in the art is inserted between the contacts 164 behind the central wall 160 of the insert 60, wherein such material also aids in retaining the contacts 164 therein. Thereafter, the braid 146 is unfolded over the second fitting end 26, and the tube 148 is pulled up over the braid 146. The ferrule 120 is then positioned over the second fitting end 26, the braid 146, and the tube 148 and the ferrule 120 is secured, such as by crimping as noted above, to secure the cable 140 to the remainder of the cable connector assembly 20. Referring to FIG. 5A, the ferrule 120 is positioned and secured such that the first O-ring 52a is sandwiched between the annular shoulder 132 of the ferrule 120 and the second wall 38 of the fitting 22 adjacent the annular shoulder 50 of the fitting 22. Further, the second O-ring 52b is sandwiched between the ferrule 120 and the second wall 38 of the fitting 22 and axially between the annular shoulder 50 of the fitting 22 and the tube 148. The ferrule 120 is crimped around substantially 360° thereof (or at discrete areas as described above) and the O-rings 52a, 52b are compressed beyond their recommended limits to provide a seal between the fitting 22, the ferrule 120, and the tube 148. Further, crimping of the ferrule 120 forces the annular ridges 128 of the ferrule 120 into the tube 148 such that portions of the tube 148 are pressed into the annular grooves 48 of the fitting 22 to retain the tube 148 between the fitting 22 and the ferrule 120. In this manner, a cable connector assembly 20 is securely maintained on the end of the cable 140 such that there is a substantially airtight seal between components of the cable connector assembly 20.

Figure 11:
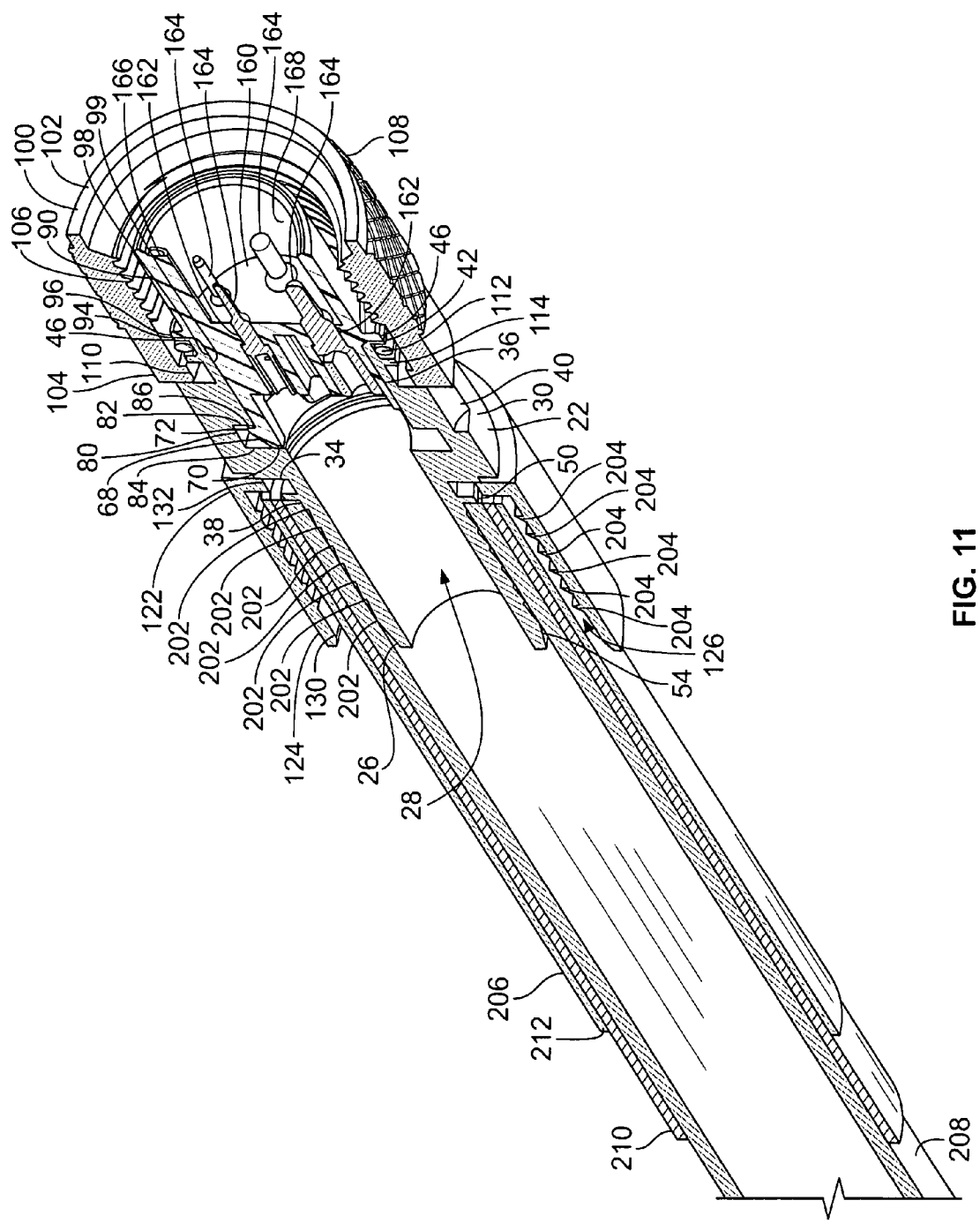
FIG. 11 is an isometric enlarged partial cross-sectional view taken generally along the lines 11-11 of FIG. 10 with wires removed therefrom for clarity.
Figures 12, 13:
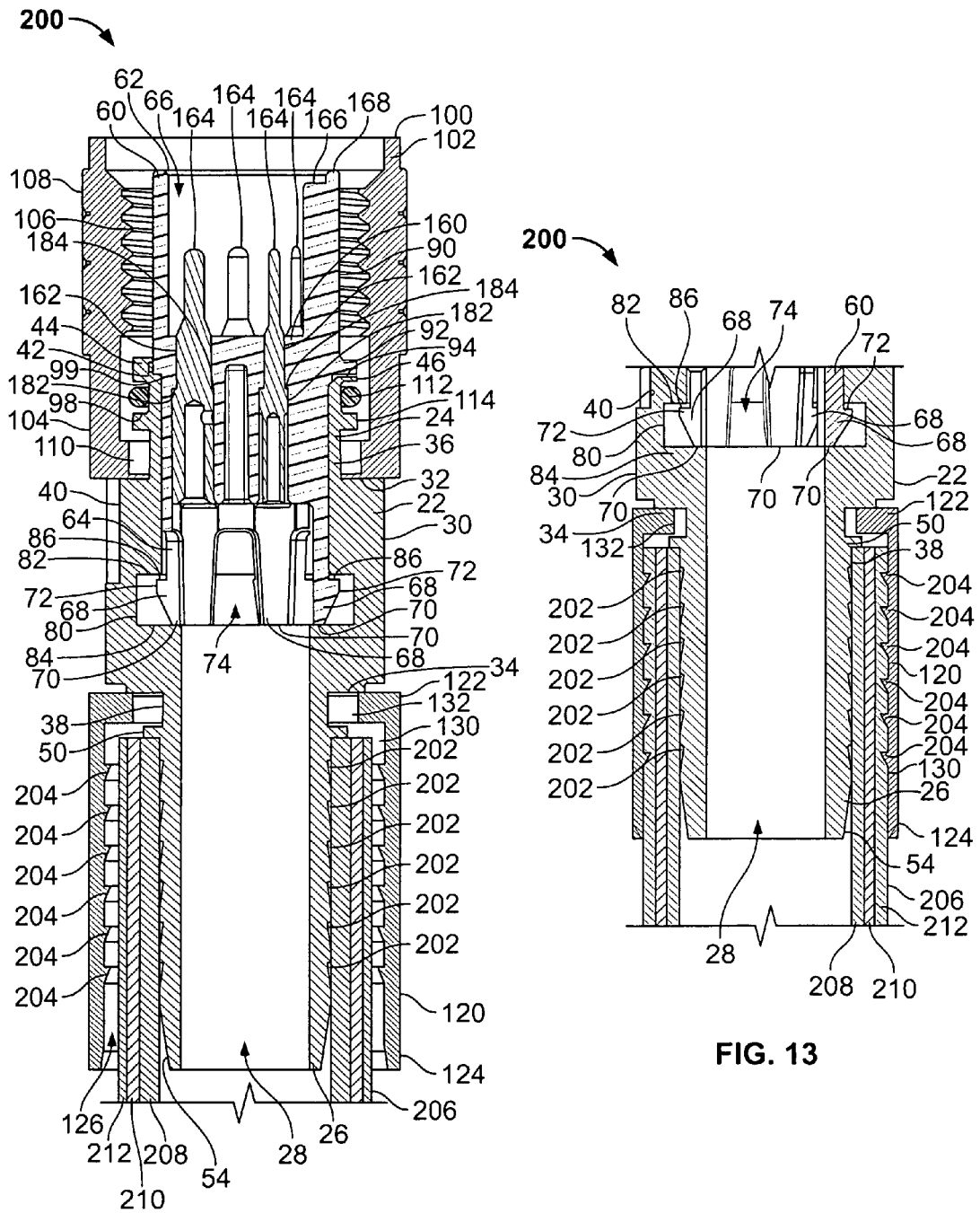
FIG. 12 is an enlarged partial cross-sectional view of the cable connector assembly taken generally along the lines 12-12 of FIG. 10 with wires removed therefrom for clarity.
FIG. 13 is an enlarged, broken, partial cross-sectional view of a ferrule of FIG. 12 secured around a cable.

FIGS. 10-13 illustrate another embodiment of a cable connector assembly 200 that is similar to the cable connector assembly 20 and wherein like numerals depict like structures. The following description will focus on the differences between the cable connector assemblies 20, 200, namely, the design of the fitting, the ferrule, and the cable design. Referring more specifically to FIGS. 11-13, the fitting 22 includes annular ridges 202 disposed axially along the length of the second wall 38. The annular ridges 202 are tapered with a deepest portion of each annular ridge 202 being disposed toward the first fitting end 24 and a shallower portion of each annular ridge 202 being disposed toward the second fitting end 26. Further, as also seen in FIGS. 11-13, the ferrule 120 includes a plurality of teeth 204 disposed axially along the inner wall 130 defining the ferrule opening 120. The teeth 204 are annular and are tapered to a point, wherein each tooth 204 is tapered such that a thickest portion of each tooth 204 is disposed toward the first ferrule end 122. Referring to the cable design, a cable 206 of FIGS. 10-13 includes an inner PTFE tube 208, a conductive braid 210 surrounding the PTFE tube 208, and an outer jacket 212 surrounding the conductive braid 210. The outer jacket 212 is formed from a abrasion-proof heat/flame resistant material such as a blend of polyester and aramid yarn, an example of which is Nomex®, PTFE, stainless steel, and the like. The cable connector assembly 200 is assembled similarly to the cable connector assembly 20, except that when the ferrule 120 is secured around the insert 22 with the cable 206 disposed therebetween, the ferrule 120 is crimped so that the teeth 204 pierce the outer jacket 212 and make contact with the conductive braid 210, as seen in FIG. 13. One or more of the teeth 204 make contact with the conductive braid 210. In the embodiment of FIGS. 10-13, each of the fitting 22, the coupling ring 100, and the ferrule 120 are made of conductive materials and are assembled to be in contact with one another. Consequently, with at least one of the teeth 204 of the ferrule 120 in contact with the conductive braid 210 and the ferrule 120 further in contact with the fitting 22, which is further in contact with the coupling ring 100, an electromagnetic interference/radio frequency interference ("EMI/RFI") shield is created across the components of the cable connector assembly 200. Therefore, the conductive braid 210 provides both structural integrity and EMI/RFI shielding to the cable connector assembly 200.

Figure 14:
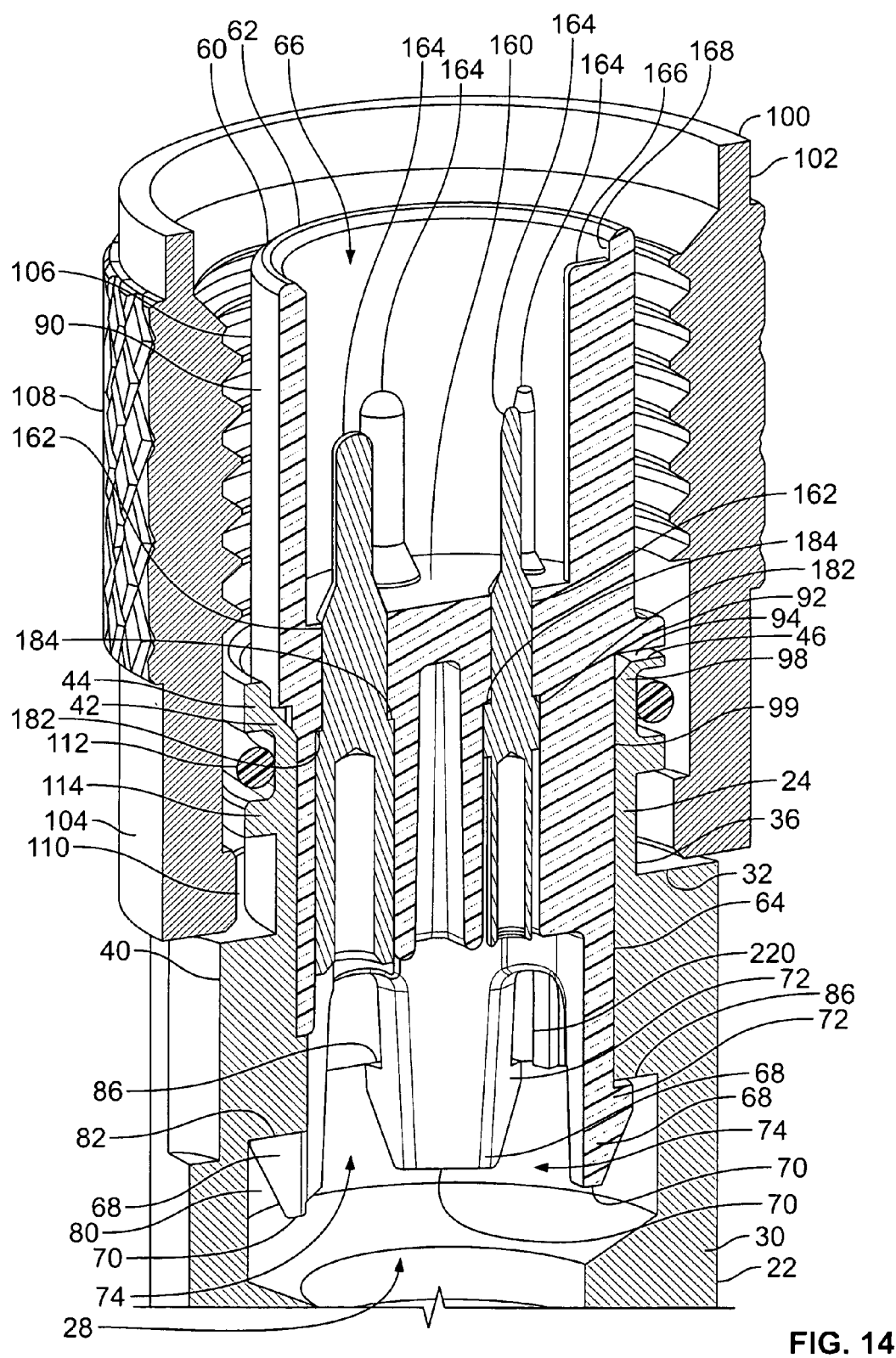
FIG. 14 is an isometric enlarged, broken, partial cross-sectional view of an insert according to a further embodiment.

FIG. 14 illustrates another embodiment having a different means for retaining the insert 60 within the fitting 22, wherein such means may be implemented in any of the cable connector assemblies disclosed herein. In FIG. 14, the fitting 22 is modified to include one or more of ribs 220 that extend inwardly from the cylindrical wall 99 defining the fitting opening 66, wherein the rib(s) 220 are disposed within the openings 74 defined between the snap legs 68 of the insert 60. In this embodiment, the rib(s) 220 interfere with the snap legs 68 to prevent inward axial movement and/or rotational movement of the insert 60 with respect to the fitting 22. As seen in FIG. 14, the ends 70 of the snap legs 68 no longer interfere with the second ledge 84 of the annular cavity 80, because the rib(s) 220 function to prevent inward axial movement of the insert 60 with respect to the fitting 22.

Various modifications may be made to the cable connector assemblies 20, 200 described herein without departing from the spirit of the present disclosure. For example, various methods of securing the components can be used, including crimping, ultrasonic welding, using adhesives, interference fits, threaded connections, and the like, as would be apparent to one of ordinary skill in the art. Further, various components of the above-described cable connector assemblies 20, 200 are described as annular. However, the term annular need not require a continuous ring but, in some embodiments, can refer to discontinuous elements or structures that form a ring-like structure. In any event, the descriptive terms used in the present disclosure are not intended to be limiting but are intended to be given their broadest possible meaning in light of the present disclosure and the understanding of one of ordinary skill in the art.

Further, although the cable connector assemblies 20, 200 and components thereof may be described herein with respect to particular orientations, such orientations are for descriptive purposes only. It should be understood that such cable connector assemblies 20, 200 and components thereof need not be positioned in a particular orientation.

INDUSTRIAL APPLICABILITY

The present disclosure provides a cable connector assembly that is particularly adapted for use in high mechanical wear environments, high moisture environment, and/or high heat environments. Further, the present disclosure also includes embodiments of the cable connector assembly that include electromagnetic interference shielding and/or keying structures that facilitate the connection to mating connectors while preventing damage to wire contacts.

Numerous modifications to the present disclosure will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A cable connector assembly, comprising:
   a fitting having first and second fitting ends and a fitting opening therethrough, wherein the fitting is formed from a conductive material;
   a ferrule having first and second ferrule ends, a ferrule opening therethrough, and one or more teeth disposed axially along the ferrule opening, wherein the ferrule is formed from a conductive material and wherein the first ferrule end is disposed over the second fitting end; and
   a tube including an outer nonconductive layer and an inner conductive layer;
   wherein the tube is disposed between the second fitting end and the first ferrule end and the ferrule is secured around the fitting so that at least one of the one or more teeth pierce the outer nonconductive layer and make contact with the inner conductive layer to create an EMI/RFI shield across the fitting, the ferrule, and the tube.

2. The cable connector assembly of claim 1 further comprising a coupling ring secured around the first fitting end, wherein the coupling ring allows attachment of the cable connector assembly to a mating connector, and wherein the coupling ring is formed from a conductive material and contacts the fitting to create an EMI/RFI shield across the coupling ring, the fitting, the ferrule, and the tube.

3. The cable connector assembly of claim 1, wherein the one or more teeth are annular and the fitting includes a plurality of annular ridges disposed on an outer surface of the fitting proximate the second fitting end and wherein the annular ridges are tapered with a deepest portion of each annular ridge being disposed toward the first fitting end.

4. The cable connector assembly of claim 1 further comprising a nonconductive insert having first and second insert ends and an insert opening therethrough, wherein the second insert end is disposed within the first fitting end.

5. The cable connector assembly of claim 4, wherein the insert includes a key structure disposed within the insert opening adjacent the first insert end, and wherein the key structure extends axially past ends of one or more wire contacts disposed within the insert opening and spaced from the first insert end.

6. The cable connector assembly of claim 4, wherein the insert includes a plurality of spaced apart snap legs disposed at the second insert end and the fitting opening defines an annular cavity disposed in a central portion thereof and having first and second annular ledges such that upon insertion of the second insert end into the first fitting end, the snap legs enter the cavity and move outwardly such that interference between the first ledge and first surfaces of the snap legs substantially prevents axial movement of the insert in a first direction and interference between the second ledge and second surfaces of the snap legs substantially prevents axial movement of the insert in a second direction opposite to the first direction.

7. The cable connector assembly of claim 4, wherein the insert includes one or more projections extending outwardly from the insert between the first and second insert ends and the fitting includes a corresponding number of grooves disposed in the first fitting end such that when the insert is disposed within the fitting, the projections are disposed within the grooves to prevent rotational movement of the insert in the fitting.

8. The cable connector assembly of claim 1, wherein the fitting includes an annular shoulder disposed between the first and second fitting ends, a first o-ring disposed on a first side of the annular shoulder, and a second o-ring disposed on a second opposing side of the annular shoulder, and wherein the ferrule is crimped around substantially 360° thereof so that the first and second o-rings are sandwiched between the fitting and the ferrule to form a seal therebetween.

9. The cable connector assembly of claim 1, wherein the outer nonconductive layer of the tube is heat resistant.

10. The cable connector assembly of claim 9, wherein the outer nonconductive layer of the tube is formed from an abrasion-proof heat/flame resistant material.

11. The cable connector assembly of claim 10, wherein the inner conductive layer of the tube is formed from a metal braid that improves mechanical integrity of the tube and provides an EMI/RFI shield.

12. The cable connector assembly of claim 11, wherein the tube further includes an innermost PTFE layer disposed adjacent the inner conductive layer.

13. The cable connector assembly of claim 12, wherein the tube includes one or more wires extending therethrough.

14. A cable connector assembly, comprising:
   a fitting having first and second fitting ends and a fitting opening therethrough, wherein the fitting is formed from a conductive material;
   a coupling ring formed from a conductive material, wherein the coupling ring is secured around the first fitting end;
   a ferrule having first and second ferrule ends, a ferrule opening therethrough, and a plurality of teeth disposed axially along the ferrule opening, wherein the ferrule is formed from a conductive material and the first ferrule end is disposed over the second fitting end; and
   a tube including an outer nonconductive layer and an inner conductive layer, wherein the tube is disposed between the second fitting end and the first ferrule end;
   wherein the ferrule is secured around the fitting so that at least one of the plurality of teeth pierce the outer nonconductive layer and make contact with the inner conductive layer to create an EMI/RFI shield across the coupling ring, the fitting, the ferrule, and the tube.

15. The cable connector assembly of claim 14, wherein the tube further includes an innermost nonconductive layer disposed adjacent the inner conductive layer and one or more wires disposed within the innermost nonconductive layer.

16. The cable connector assembly of claim 15, wherein the outer nonconductive layer of the tube is heat resistant and formed of an abrasion-proof heat/flame resistant material.

17. The cable connector assembly of claim 16, wherein the inner conductive layer of the tube is formed from a metal braid that improves mechanical integrity of the tube and provides an EMI/RFI shield.

18. The cable connector assembly of claim 14, wherein the plurality of teeth are annular.

19. A cable connector assembly, comprising:
   a fitting having first and second fitting ends and a fitting opening therethrough, wherein the fitting is formed from a conductive material;
   a coupling ring formed from a conductive material, wherein the coupling ring contacts the first filling end;
   a ferrule having first and second ferrule ends, a ferrule opening therethrough, and one or more teeth disposed axially along the ferrule opening, wherein the ferrule is formed from a conductive material and the first ferrule end is disposed over the second fitting end; and
   at least one wire disposed within a tube, wherein the tube includes an outer nonconductive and heat resistant layer, a middle conductive layer, and an inner nonconductive layer and wherein the tube is disposed between the second fitting end and the first ferrule end;

wherein the ferrule is secured to contact the fitting and so that at least one of the one or more teeth pierce the outer nonconductive layer and make contact with the middle conductive layer to create an EMI/RFI shield across the coupling ring, the fitting, the ferrule, and the tube.

20. The cable connector assembly of claim 19 further comprising a nonconductive insert having first and second insert ends and an insert opening therethrough, wherein the second insert end is disposed within the first fitting end and the at least one wire is retained within the insert opening by at least one wire contact.

* * * * *